(12) United States Patent
Ohwaki et al.

(10) Patent No.: US 8,149,299 B2
(45) Date of Patent: Apr. 3, 2012

(54) APPARATUS AND METHOD FOR GENERATING A PICTURE HAVING A HIGH VISIBILITY

(75) Inventors: Kazuyasu Ohwaki, Kanagawa-ken (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 885 days.

(21) Appl. No.: 12/056,105

(22) Filed: Mar. 26, 2008

(65) Prior Publication Data

US 2008/0239090 A1  Oct. 2, 2008

(30) Foreign Application Priority Data

Mar. 26, 2007 (JP) ................ P2007-079238

(51) Int. Cl.
*H04N 5/217* (2011.01)
*H04N 5/228* (2006.01)

(52) U.S. Cl. ............ 348/241; 348/222.1; 382/260

(58) Field of Classification Search ............ 348/241; 382/263, 264
See application file for complete search history.

(56) References Cited

U.S. PATENT DOCUMENTS

| | | | |
|---|---|---|---|
| 5,991,456 A | 11/1999 | Rahman et al. | |
| 6,941,028 B2* | 9/2005 | Kimmel et al. | 382/274 |
| 7,127,122 B2 | 10/2006 | Ogata et al. | |
| 7,298,917 B2* | 11/2007 | Sakatani et al. | 382/254 |
| 7,489,814 B2* | 2/2009 | Spitzer et al. | 382/167 |
| 7,525,579 B2* | 4/2009 | Katagiri | 348/234 |
| 7,590,303 B2* | 9/2009 | Lee et al. | 382/274 |
| 7,733,390 B2* | 6/2010 | Kuniba | 348/241 |
| 7,760,943 B2* | 7/2010 | Shaked | 382/174 |
| 7,778,478 B2* | 8/2010 | Kuniba | 382/254 |
| 7,843,493 B2* | 11/2010 | Katagiri et al. | 348/222.1 |
| 2005/0089239 A1 | 4/2005 | Brajovic | |
| 2006/0215908 A1* | 9/2006 | Kamon et al. | 382/167 |
| 2008/0226191 A1* | 9/2008 | Ohwaki et al. | 382/264 |
| 2009/0080771 A1* | 3/2009 | Kamon et al. | 382/166 |
| 2009/0245679 A1* | 10/2009 | Ohwaki et al. | 382/260 |

FOREIGN PATENT DOCUMENTS

| | | |
|---|---|---|
| EP | 1 404 120 A1 | 3/2004 |
| JP | 2000-511315 | 8/2000 |
| JP | 2003-008935 | 1/2003 |

OTHER PUBLICATIONS

European Search Report issued by the European Patent Office on Nov. 19, 2008, for European Patent Application No. 08005020.6.
Meylan et al., "High Dynamic Range Image Rendering With a Retinex-Based Adaptive Filter," IEEE Transactions on Image Processing (Sep. 2006), 15:2820-2830.

(Continued)

*Primary Examiner* — Ngoc-Yen Vu
(74) *Attorney, Agent, or Firm* — Finnegan, Henderson, Farabow, Garrett & Dunner, L.L.P.

(57) ABSTRACT

A first filter generates a first smooth picture by smoothing an input picture. A second filter generates a second smooth picture by smoothing the input picture. The second filter has a characteristic different from the first filter. A contrast component picture calculation unit generates a contrast component picture by dividing each pixel value of the input picture with the pixel value of the first smooth picture. A picture composition unit generates a composed picture by composing the second smooth picture with the contrast component picture.

9 Claims, 5 Drawing Sheets

OTHER PUBLICATIONS

Durand et al., "Fast Bilateral Filtering for the Display of High-Dynamic-Range Images," ACM Transactions on Graphics (Jul. 1, 2002), 21:257-266.

Ogata et al., "Dynamic Range Compression Based on Illumination Compensation," IEEE Transactions on Consumer Electronics (Aug. 2001), 47:548-558.

Zetzsche et al., "Multiple channel model for the prediction of subjective image quality," SPIE (1989), 1077:209-216.

U.S. Appl. No. 12/048,988, filed Mar. 14, 2008, to Ohwaki et al.

Notice of Reasons for Rejection issued by the Japanese Patent Office in Japanese Patent Application No. 2007-079238, mailed Feb. 18, 2011, (2 pages total).

* cited by examiner

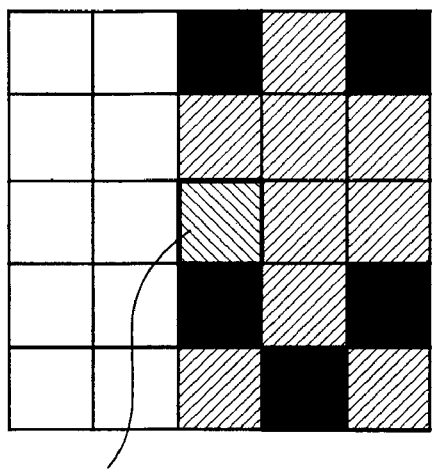
CENTER PIXEL
FIG. 5A
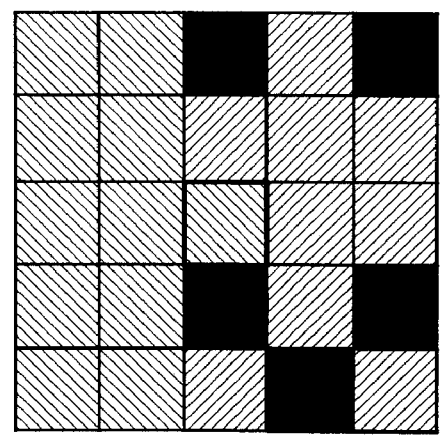
FIG. 5B
| 0.111 | 0.111 | 0.111 |
|-------|-------|-------|
| 0.111 | 0.112 | 0.111 |
| 0.111 | 0.111 | 0.111 |
FIG. 6

| 0.075 | 0.125 | 0.075 |
| --- | --- | --- |
| 0.125 | 0.2 | 0.125 |
| 0.075 | 0.125 | 0.075 |

APPARATUS AND METHOD FOR GENERATING A PICTURE HAVING A HIGH VISIBILITY

CROSS-REFERENCE TO RELATED APPLICATIONS

This application is based upon and claims the benefit of priority from prior Japanese Patent Application No. 2007-079238, filed on Mar. 26, 2007; the entire contents of which are incorporated herein by reference.

FIELD OF THE INVENTION

The present invention relates to a picture processing apparatus and a method for generating a picture having enhanced or compressed contrast.

BACKGROUND OF THE INVENTION

As a technique to compress a dynamic range, a picture is separated into an illumination component and a reflection component (Hereafter, it is called "a contrast component"), and the illumination component is compressed. The dynamic range with high contrast may be compressed.

As to video contents of an input picture, the illumination component of the picture generally corresponds to an outward light or an illumination light, and becomes a uniform brightness component for an object. In other words, the illumination component is a low spatial frequency component. Accordingly, a smoothing filter subjected to the input picture is an effective means to extract the illumination component of the picture. For example, a low-pass filter is often used as the smoothing filter.

As a filter for separating the illumination component, in general, a Gaussian filter (linear filter) to operate convolution with fixed filter coefficient may be used.

In case of using the linear filter for separating the illumination component, a brightness blur (Hereafter, it is called "a halo") often occurs at a boundary of an object in the picture. The reason of occurrence is as follows. In case of using the linear filter, an illumination component picture including the boundary of the object is uniformly subjected to the filter processing. As a result, an error signal is mixed at a boundary between adjacent objects.

As a method for reducing the halo, by using a plurality of linear smoothing filters each having a different scale, a result obtained by each smoothing filter is added with weighted-ratio. However, improvement effect by this method is insufficient. In order to reduce the halo, the illumination component must be extracted with high spatial accuracy.

Another method for reducing the halo is disclosed in JP-A 2003-8935 (Kokai). In this patent reference, an epsilon filter (non-linear filter) having a superior ability to preserve edges is used as the filter for separating the illumination component. Furthermore, by controlling a threshold for the epsilon filter, a boundary of the object is suitably extracted. As a result, occurrence of the halo is reduced.

However, in this patent reference, the boundary of the object (an edge element including a segment or a character) is suitably extracted from the illumination component. Accordingly, in case of compressing the illumination component, the boundary of the object is also compressed. Furthermore, the boundary of the object is extracted not from the contrast component but from the illumination component. Even if the contrast component is composed with the illumination component, the boundary of the object is not included in the contrast component. Briefly, by compressing the illumination component, the boundary of the object is also compressed.

SUMMARY OF THE INVENTION

The present invention is directed to a picture processing apparatus and a method for generating a picture with high visibility by using one filter to extract a contrast component and another filter to extract an illumination component.

According to an aspect of the present invention, there is provided an apparatus for processing a picture, comprising: a first filter configured to generate a first smooth picture by smoothing an input picture; a second filter configured to generate a second smooth picture by smoothing the input picture, the second filter having a characteristic different from the first filter; a contrast component picture calculation unit configured to generate a contrast component picture by dividing each pixel value of the input picture with the pixel value of the first smooth picture; and a picture composition unit configured to generate a composed picture by composing the second smooth picture with the contrast component picture.

According to another aspect of the present invention, there is also provided a method for processing a picture, comprising: generating a first smooth picture by filtering an input picture using a first filter; generating a second smooth picture by filtering the input picture using a second filter, the second filter having a characteristic different from the first filter; generating a contrast component picture by dividing each pixel value of the input picture with the pixel value of the first smooth picture; and generating a composed picture by composing the second smooth picture with the contrast component picture

BRIEF DESCRIPTION OF THE DRAWINGS

FIGS. 5A and 5B are schematic diagrams of examples of an epsilon filter.

FIG. 6 is a schematic diagram of an example of coefficients of an average filter.

DETAILED DESCRIPTION OF THE EMBODIMENTS

Figure 1:
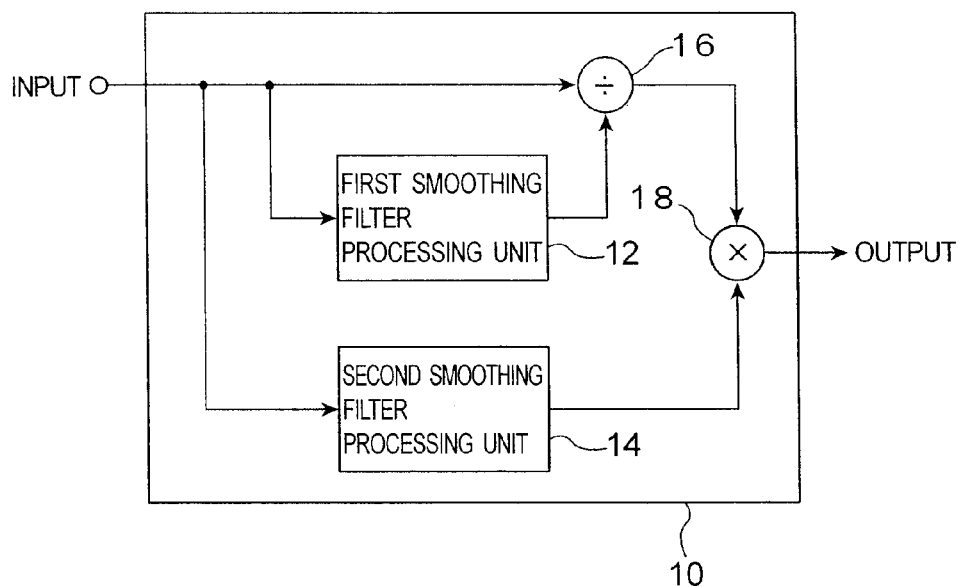
FIG. 1 is a block diagram of the picture processing apparatus according to a first embodiment.

Hereinafter, various embodiments of the present invention will be explained by referring to the drawings. The present invention is not limited to the following embodiments.

(First Embodiment)

FIG. 1 is a block diagram of the picture processing apparatus according to the first embodiment. The image processing apparatus 10 includes a first smoothing filter processing unit 12 (a first smoothing filter), a second smoothing filter processing unit 14 (a second smoothing filter), a divider 16 (a contrast component picture operation unit), and a multiplier 18 (a picture composition unit).

The first smoothing filter processing unit 12 superimposes the first smoothing filter onto an input picture, and generates a first smoothed picture LPF_P1 as follows.

$$P_{LPF\_P1}(x, y) = \sum_{i=-k}^{k} \sum_{j=-l}^{l} T_{LPF\_P1}(i, j) \cdot x(x - i, y - j) \quad (1)$$

In equation (1), "$P_{LPF\_P1}(x,y)$" represents first smoothed picture data at a pixel position (x,y), "$T_{LPF\_P1}(x,y)$" represents a filter coefficient of the first smoothing filter, "X(x,y)" represents picture data of an input picture at the pixel position (x,y), "k" represents a pixel range along a lateral direction to be filtered, and "l" represents a pixel range to be filtered.

In the same way, the second smoothing filter processing unit 12 superimposes the second smoothing filter (different from the first smoothing filter) onto the input picture, and generates a second smoothed picture LPF_P2 as follows.

$$P_{LPF\_P2}(x, y) = \sum_{i=-k}^{k} \sum_{j=-l}^{l} T_{LPF\_P2}(i, j) \cdot x(x - i, y - j) \quad (2)$$

In equation (2), "$P_{LPF\_P2}(x,y)$" represents second smoothed picture data at the pixel position (x,y), "$T_{LPF\_P2}(x,y)$" represents a filter coefficient of the second smoothing filter, "X(x,y)" represents picture data of an input picture at the pixel position (x,y), "k" represents a pixel range along a lateral direction to be filtered, and "l" represents a pixel range to be filtered.

Next, the divider 16 divides the input picture by the first smoothed picture LPF_P1, and generates a contrast component picture CC of the input picture as follows.

$$Q_{CC}(x,y) = X(x,y)/P_{LPF\_P1}(x,y) \quad (3)$$

In equation (3), "$Q_{CC}(x,y)$" represents contrast component picture data at the pixel position (x,y).

Usually, by smoothing filter processing, a low spatial frequency component is extracted from an original picture. Accordingly, by subtracting the low spatial frequency component from the original picture, a high spatial frequency component is obtained. However, in the present embodiment, division is applied instead of subtraction. Briefly, the low spatial frequency component is regarded as an average brightness of the original picture, and a ratio of each pixel value to the average brightness (i.e., a contrast) is calculated. As a result, a picture generated by the division is regarded as the contrast component picture.

In case of above processing with logarithm data (the input picture and the first smoothed picture LPF_P1 are given by logarithm data, and the contrast component picture is generated by logarithm data), the subtraction is operated from the logarithm rule as follows.

$$\log Q_{CC}(x,y) = \log X(x,y) - \log P_{LPF\_P1}(x,y) \quad (3\text{-}2)$$

Briefly, the divider 16 is realized as a subtractor. Hereafter, in case of using logarithm data, the division is replaced with subtraction, and the multiplication is replaced with addition according to logarithm rule.

The multiplier 18 multiplies the contrast component picture CC with the second smoothed picture LPF_P2 as follows, and generates a contrast enhanced picture (i.e., an output picture).

$$R(x,y) = P_{LPF\_P2}(x,y) \times Q_{CC}(x,y) \quad (4)$$

In equation (4), "R(x,y)" represents picture data having enhanced contrast.

In the picture processing apparatus of the first embodiment, a contrast component (extracted by the first smoothing filter processing unit 12) is composed with an illumination component (extracted by the second smoothing filter processing unit 14 (having characteristic different from the first smoothing filter processing unit 12)). As a result, an output picture different from the input picture is generated.

The first smoothing filter processing unit 12 executes preprocessing to extract the contrast component. If the first smoothing filter processing unit uses a strong smoothing filter, many contrast components are extracted by the divider 16. For example, if the first smoothing filter processing unit 12 uses an average filter having a large kernel, in comparison with an average filter having a small kernel, contrast components are easily extracted by the divider 16.

The second smoothing filter processing unit 14 executes processing to extract the illumination component. If the second smoothing filter processing unit 14 uses an edge preserving smoothing filter, a halo reduces, an area having monotonous brightness is further smoothed, and an edge part is preserved. As a result, the multiplier 18 generates an output picture having enhanced contrast of a texture or an edge part. Briefly, the illumination element and the contrast component are independently extracted according to a target picture.

(Second Embodiment)

Figure 2:
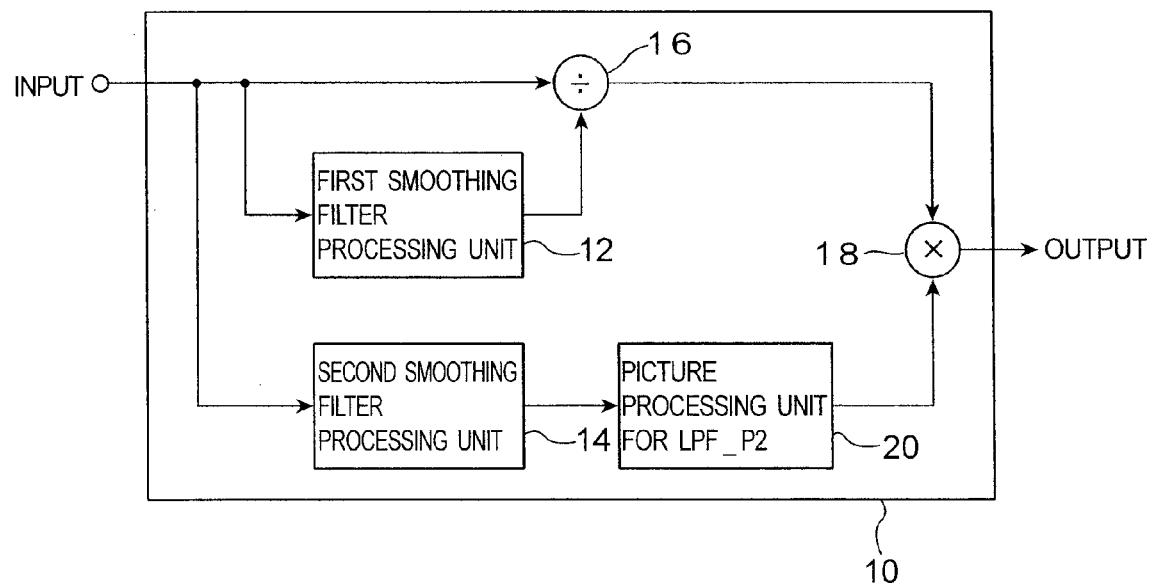
FIG. 2 is a block diagram of the picture processing apparatus according to a second embodiment.

FIG. 2 is a block diagram of the picture processing apparatus according to the second embodiment. The image processing apparatus 10 includes the first smoothing filter processing unit 12, the second smoothing filter processing unit 14, the divider 16, the multiplier 18, and a picture processing unit 20 for LPF_P2.

The picture processing unit 20 for LPF_P2 converts a video signal level of the second smoothed picture LPF_P2 (obtained by the second smoothing filter processing). The conversion means enhancement or compression of the video signal level. For example, gamma conversion or histogram smoothing is applied. The gamma conversion is represented as follows.

$$P_{T\_LPF\_P2}(x,y) = \alpha \cdot P_{LPF\_P2}(x,y) \quad (5)$$

In equation (5), "$P_{T\_LPF\_P2}(x,y)$" represents second smoothed picture data at a pixel position (x,y) after level-conversion, "$\alpha$" represents a weight coefficient for LPF_P2, and "$P_{LPF\_P2}(x,y)$" represents second smoothed picture data at the pixel position (x,y).

By the picture processing unit 20 for LPF_P2, for example, a dynamic range of an input picture is compressed, a dark picture is brightened, and a brightness level of an area of the input picture is converted.

The multiplier 18 generates an output picture represented as follows.

$$R(x,y) = P_{T\_LPF\_P2}(x,y) \times Q_{CC}(x,y) \quad (6)$$

In equation (6), "R(x,y)" represents picture data at a pixel position (x,y) after enhancing contrast, "$P_{T\_LPF\_P2}(x,y)$" represents second smoothed picture data at the pixel position (x,y) after level-conversion, and "$Q_{CC}(x,y)$" represents contrast component picture data (of the input picture) at the pixel position (x,y).

Except for above component and processing, the picture processing apparatus 10 of the second embodiment is the same as the first embodiment. According to the picture processing apparatus 10 of the second embodiment, a picture having an enhanced contrast can be generated while converting level (such as dynamic range compression) of the picture.

(Third Embodiment)

Figure 3:
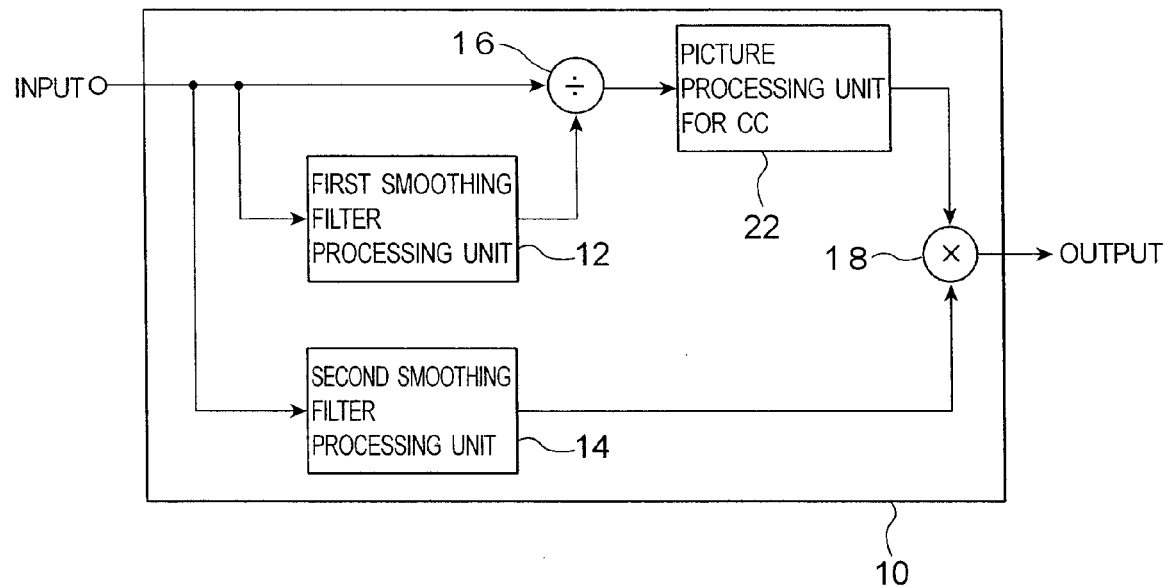
FIG. 3 is a block diagram of the picture processing apparatus according to a third embodiment.

FIG. 3 is a block diagram of the picture processing apparatus 10 according to the third embodiment. The image processing apparatus 10 includes the first smoothing filter processing unit 12, the second smoothing filter processing unit 14, the divider 16, the multiplier 18, and a picture processing unit 22 for CC.

The picture processing unit 22 for CC converts a video signal level of a contrast component picture CC. The conversion means enhancement or compression of the video signal level. This conversion is represented as follows.

$$Q_{T\_CC}(x,y)=\beta \cdot Q_{CC}(x,y) \quad (7)$$

In equation (7), "$Q_{T\_CC}(x,y)$" represents contrast component picture data at a pixel position (x,y) after level conversion, "$\beta$" represents a weight coefficient for CC, and "$Q_{CC}(x,y)$" represents contrast component picture data (of the input picture) at the pixel position (x,y).

A contrast component may be enhanced by power-calculation as follows.

$$Q_{T\_CC}(x,y)=Q_{CC}^{\gamma}(x,y) \quad (8)$$

In equation (8), "$Q_{T\_CC}(x,y)$" represents contrast component picture data at a pixel position (x,y) after level conversion, "$\gamma$" represents a weight coefficient for CC, and "$Q_{CC}(x,y)$" represents contrast component picture data (of the input picture) at the pixel position (x,y). In this case, multiplication may be calculated instead of power calculation. Briefly, the contrast component can be further enhanced by the picture processing unit 22 for CC.

The multiplier 18 generates an output picture represented as follows.

$$R(x,y)=P_{LPF\_P2}(x,y) \times Q_{T\_CC}(x,y) \quad (9)$$

In above equation (9), "$R(x,y)$" represents picture data at a pixel position (x,y) after enhancing contrast, "$P_{LPF\_P2}(x,y)$" represents second smoothed picture data at the pixel position (x,y), and "$Q_{T\_CC}(x,y)$" represents contrast component picture data at the pixel position (x,y) after level conversion.

Except for above component and processing, the picture processing apparatus 10 of the third embodiment is the same as the first embodiment. According to the picture processing apparatus 10 of the third embodiment, a picture having a more enhanced contrast can be generated.

(Fourth Embodiment)

Figure 4:
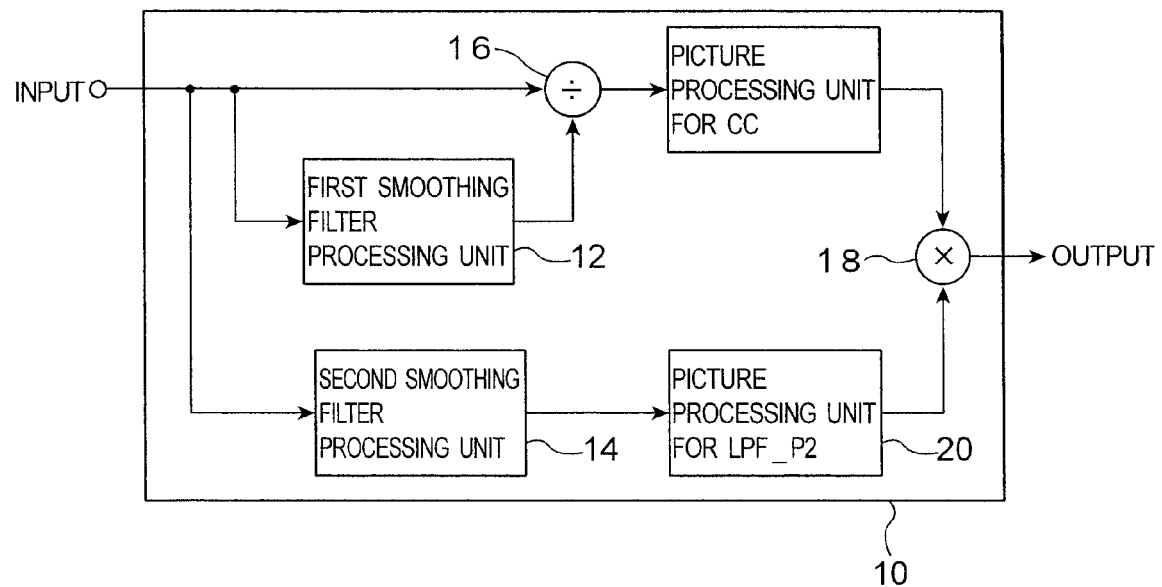
FIG. 4 is a block diagram of the picture processing apparatus according to a fourth embodiment.

FIG. 4 is a block diagram of the picture processing apparatus 10 according to the fourth embodiment. The image processing apparatus 10 includes the first smoothing filter processing unit 12, the second smoothing filter processing unit 14, the divider 16, the multiplier 18, the picture processing unit 20 for LPF_P2, and the picture processing unit 22 for CC.

The picture processing unit 20 for LPF_P2 converts a video signal level of the second smoothed picture LPF_P2 (obtained by the second smoothing filter processing). The conversion means enhancement or compression of the video signal level. Concretely, for example, gamma conversion or histogram smoothing is applied. The gamma conversion is represented by equation (5).

By the picture processing unit 20 for LPF_P2, for example, a dynamic range of the input picture is compressed, a dark picture is brightened, and a brightness level of an area of the input picture is converted.

The picture processing unit 22 for CC converts a video signal level of a contrast component picture CC. The conversion means enhancement or compression of the video signal level. This conversion is represented by equation (7). For example, a contrast component may be enhanced by power-calculation of equation (8). Briefly, the contrast component is further enhanced by the picture processing unit 22.

The multiplier 18 generates an output picture represented as follows.

$$R(x,y)=P_{T\_LPF\_P2}(x,y) \times Q_{T\_CC}(x,y) \quad (10)$$

In equation (10), "$R(x,y)$" represents picture data at a pixel position (x,y) after enhancing contrast, "$P_{T\_LPF\_P2}(x,y)$" represents second smoothed picture data at the pixel position (x,y) after level-conversion, and "$Q_{T\_CC}(x,y)$" represents contrast component picture data at the pixel position (x,y) after level conversion.

Except for above units and processing, the picture processing apparatus 10 of the fourth embodiment is the same as the first embodiment. According to the picture processing apparatus 10 of the fourth embodiment, a picture having a more enhanced contrast can be generated while converting level of the input picture (such as compression of dynamic range).

(Fifth Embodiment)

The fifth embodiment relates to the first smoothing filter processing unit 12 and the second smoothing filter processing unit 14. First, a combination of filters to enhance a contrast and reduce a noise without a halo is explained.

An ideal filter for extracting an illumination component (the second smoothing filter) is a filter for reducing a noise without the halo. For example, a non-linear smoothing filter of edge preserve is used. The non-linear smoothing filter passes a brightness change larger than a predetermined condition, and eliminates the brightness change smaller than the predetermined condition. In other words, the non-linear smoothing filter selectively smoothes an edge weaker than the predetermined condition by remaining an edge stronger than the predetermined condition.

As the non-linear smoothing filter of edge preserve type, an epsilon filter, a rank-order filter (such as a median filter), an alpha trimmed average filter, a filter based on robust estimation, a bilateral filter, or a trilateral filter, may be used.

In the following explanation, the epsilon filter is used as the non-linear smoothing filter of edge preserve type. As to the epsilon filter, a difference of absolute value between a center pixel value and each surrounding pixel value in a block to be filtered is calculated. If the difference is below a threshold (Hereafter, it is called ε value), the surrounding pixel value is maintained. If the difference is above the threshold, the surrounding pixel value is replaced with the center pixel value.

FIGS. 5A and 5B show examples of pixel values processed by the epsilon filter. In an original pixel pattern shown in FIG. 5A, a center pixel value is gray, surrounding pixel values are white, gray, or black. A difference between the center pixel value and the surrounding pixel value (gray or black) is below ε, and a difference between the center pixel value and the surrounding pixel value (white) is above ε. In this case, as shown in FIG. 5B, the surrounding pixel value (white) is replaced with the center pixel value (gray). In this way, smoothing processing of matrix 5×5 is operated.

Figure 9:
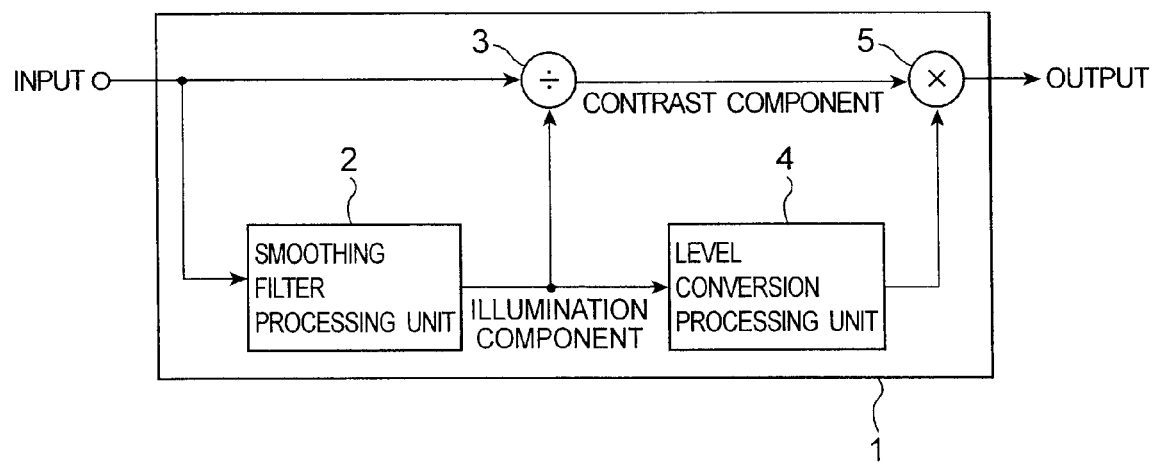
FIG. 9 is a block diagram of the picture processing apparatus according to the prior art.

The epsilon filter may eliminate a small signal noise (or Gaussian noise) while preserving edges. In a general picture processing apparatus shown in FIG. 9, if an illumination component is extracted from the input picture using the epsilon filter, an edge component is extracted as the illumination component. Briefly, a contrast component includes not the edge component but another component (texture). Accordingly, if the illumination component is compressed, the edge component is also compressed. Furthermore, if the illumination component is combined with the contrast component without compression, a picture the same as the input picture is output.

Next, an ideal filter (the first smoothing filter) for extracting a contrast component is a filter for extracting more contrast components. For example, a linear low-pass filter is used. In the following explanation, an average value filter is used as the low-pass filter. FIG. 6 shows an example of filter coefficients of the average filter.

As to a filter for extracting a contrast component, it is desirable that a kernel size is smaller and a smoothing is more effectively executed. By extracting a contrast component using this filter, a texture component included in a picture is more effectively executed, and a picture having more substantial feeling can be generated.

In this case, an average filter (liner filter) is used as the first smoothing filter processing unit 12 (filter for extracting a contrast component), and an epsilon filter (non-linear filter of edge preserve) is used as the second smoothing filter processing unit 14 (filter for extracting an illumination component).

In the second and fourth embodiments, in case of compressing the illumination component (i.e., compression of video signal level by the picture processing unit 20 for LPF_P2), the edge component extracted from the illumination component is compressed, but more edge components (contrast) are extracted from the contrast component. Accordingly, even if the illumination component is compressed, the halo is reduced or eliminated, and the edge component in the picture is preserved. In some case, a picture having an enhanced contrast component can be generated.

Furthermore, if the illumination component is not compressed (i.e., level-conversion except for compression), the halo is harder to occur, and the picture having a more enhanced contrast component can be generated.

In the first embodiment, the input picture is not output as it is. A picture that a contrast is more enhanced and a small signal noise is reduced without a halo is output. Furthermore, in the third embodiment, a picture with high visibility and enhanced contrast without the halo is output.

(Sixth Embodiment)

The sixth embodiment relates to the first smoothing filter processing unit 12 and the second smoothing filter processing unit 14. In the sixth embodiment, the first smoothing filter processing unit 12 and the second smoothing filter processing unit 14 are linear low-pass filters. The second smoothing filter processing unit 14 passes a frequency component higher than the first smoothing filter processing unit 12.

In case that the first smoothing filter processing unit 12 and the second smoothing filter processing unit 14 are linear filters, as mentioned-above, the first smoothing filter processing unit 12 had better use a filter for the divider 16 to extract more contrast components. For example, a kernel size of the filter may be larger. Furthermore, the second smoothing filter processing unit 14 preferably uses a filter to smooth while preserving more edge components.

Accordingly, for example, the first smoothing filter processing unit 12 uses an average filter having coefficients shown in FIG. 6. The second smoothing filter processing unit 14 uses a Gaussian filter having coefficients shown in FIG. 6 with a larger weight assigned to a center pixel.

Furthermore, if the Gaussian filter is used as both the first smoothing filter processing unit 12 and the second smoothing filter processing unit 14, the first smoothing filter processing unit 12 uses a filter having coefficients with larger weights assigned to surrounding pixels. The second smoothing filter processing unit 14 uses a filter having coefficients with larger weights assigned to the center pixel.

Furthermore, if the average filter is used as both the first smoothing filter processing unit 12 and the second smoothing filter processing unit 14, the first smoothing filter processing unit 12 uses the filter having a larger kernel size. The second smoothing filter processing unit 14 uses the filter having a smaller kernel size.

In this way, the first smoothing filter uses a filter executing more smoothing, and the second smoothing filter uses a filter preserving more edge components. As a result, a desirable picture can be generated.

(Seventh Embodiment)

The seventh embodiment relates to the first smoothing filter processing unit 12 and the second smoothing filter processing unit 14. In case that the first smoothing filter processing unit 12 and the second smoothing filter processing unit 14 are respectively a non-linear filter, as mentioned-above, the first smoothing filter processing unit 12 had better use a filter to extract more contrast components. Concretely, a kernel size of the filter had better be larger. Furthermore, the second smoothing filter processing unit 14 had better use a filter to smooth while preserving more edge components.

For example, if the epsilon filter is used as both the first smoothing filter processing unit 12 and the second smoothing filter processing unit 14, the first smoothing filter processing unit 12 uses the filter having a larger threshold $\epsilon$. The second smoothing filter processing unit 14 uses the filter having a smaller threshold $\epsilon$.

In this way, the first smoothing filter uses a filter executing more smoothing, and the second smoothing filter uses a filter preserving more edge components. As a result, a desirable picture can be generated.

(Eighth Embodiment)

Figures 7, 8:
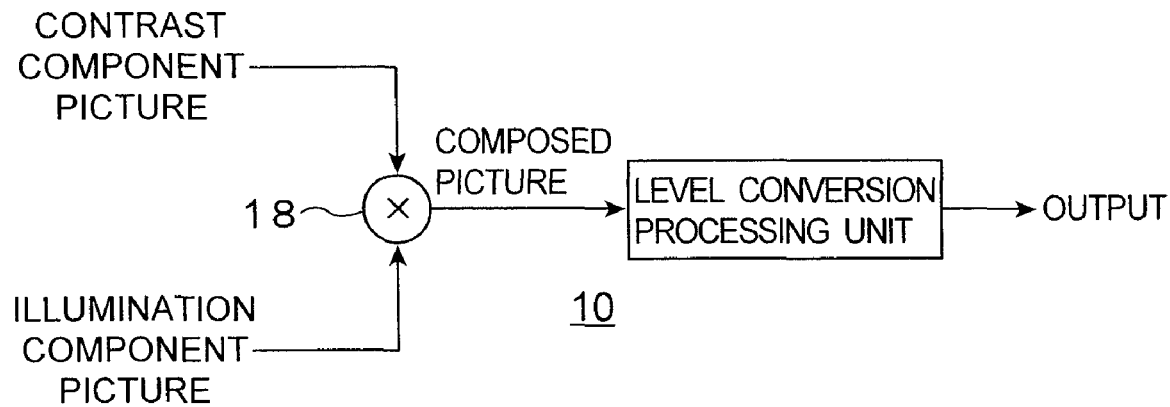
FIG. 7 is a block diagram of the picture processing apparatus according to an eighth embodiment.
FIG. 8 is a schematic diagram of an example of coefficients of a Gaussian filter.

FIG. 7 is a block diagram of the picture processing apparatus 10 according to the eighth embodiment.

A composed picture is generated by multiplying an illumination component picture with a contrast component picture. However, if picture data of the illumination component and the contrast component are large, the picture data (pixel value) becomes above the maximum pixel level displayable by a display device. In this case, picture data (pixel value) above the maximum pixel level (For example, "255") in the composed picture is replaced with "255".

On the other hand, if both picture data (pixel value) of the illumination component and the contrast component is small, the picture data (pixel value) of the composed picture becomes "0". In this way, if the picture data (pixel value) in a composed picture is biased above "255" or below "0", the composed picture partially includes a black mass or a white mass.

In order to solve this problem, for example, histogram-smoothing processing is effective for the composed picture. The histogram-smoothing processing is executed by the level conversion processing unit 24. As mentioned-above, by converting a level of the composed picture, an output picture that the black mass and the white mass are reduced can be generated.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), or an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software) such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing a picture, comprising:
   a first filter unit configured to superimpose a first filter onto an input image, and generate a first smooth picture;
   a second filter unit configured to superimpose a second filter onto the input image, and generate a second smooth picture, the second filter having a characteristic different from the first filter;
   a calculation unit configured to calculate a contrast component picture by dividing each pixel value of the input image with the pixel value of the first smooth picture; and
   a picture composition unit configured to compose the second smooth picture with the contrast component picture, and generate a composed picture.

2. The apparatus according to claim 1, further comprising:
   a picture processing unit for the second smooth picture configured to convert a video signal level of the second smooth picture.

3. The apparatus according to claim 1, further comprising:
   a picture processing unit for the contrast component picture configured to convert a video signal level of the contrast component picture.

4. The apparatus according to claim 1, further comprising:
   a picture processing unit for the second smooth picture configured to convert a video signal level of the second smooth picture; and
   a picture processing unit for the contrast component picture configured to convert a video signal level of the contrast component picture.

5. The apparatus according to claim 1, wherein
   the first filter comprises a linear low-pass filter, and
   the second filter comprises a non-linear filter to selectively smooth an edge component more than a predetermined condition.

6. The apparatus according to claim 1, wherein
   the first filter and the second filter comprise linear low-pass filters, and
   the second filter passes a frequency component higher than the first filter.

7. The apparatus according to claim 1, wherein
   the first filter and the second filter comprise non-linear filters to selectively smooth an edge component more than a predetermined condition.

8. The apparatus according to claim 1, further comprising:
   a level conversion processing unit configured to convert a gradation of the composed picture so that the gradation is within a gradation level of a display device to display the composed picture.

9. A method for processing a picture, comprising:
   generating a first smooth picture by superimposing a first filter onto an input image;
   generating a second smooth picture by superimposing a second filter onto the input image, the second filter having a characteristic different from the first filter;
   calculating a contrast component picture by dividing each pixel value of the input image with the pixel value of the first smooth picture; and
   generating a composed picture by composing the second smooth picture with the contrast component picture.

* * * * *